(12) United States Patent
Yang

(10) Patent No.: US 12,460,397 B2
(45) Date of Patent: Nov. 4, 2025

(54) RAINWATER HARVESTING SYSTEM

(71) Applicant: Bo Yang, Suzhou (CN)

(72) Inventor: Bo Yang, Suzhou (CN)

(*) Notice: Subject to any disclaimer, the term of this patent is extended or adjusted under 35 U.S.C. 154(b) by 120 days.

(21) Appl. No.: 18/370,433

(22) Filed: Sep. 20, 2023

(65) Prior Publication Data
US 2025/0092647 A1 Mar. 20, 2025

(51) Int. Cl.
*E03B 3/02* (2006.01)

(52) U.S. Cl.
CPC ............ *E03B 3/02* (2013.01); *Y10T 137/6969* (2015.04); *Y10T 137/698* (2015.04)

(58) Field of Classification Search
CPC . Y10T 137/6969; Y10T 137/698; E03B 3/02; E03B 3/03; Y02A 10/108
USPC ................................ 137/357, 360; 52/12, 16
See application file for complete search history.

(56) References Cited

U.S. PATENT DOCUMENTS

| | | | | |
|---|---|---|---|---|
| 899,568 A * | 9/1908 | Shepard | ............... | B01D 29/111 210/163 |
| 1,177,174 A * | 3/1916 | Doty | .................... | B01D 35/147 210/317 |
| 1,188,280 A * | 6/1916 | Kuenzli | ................. | B01D 35/02 210/433.1 |
| 1,653,473 A * | 12/1927 | Schulz | .................... | B01D 35/28 210/433.1 |
| 2,494,780 A * | 1/1950 | Schmidt | .............. | E04D 13/0645 210/162 |
| 4,250,024 A * | 2/1981 | Soares | ................... | B01D 35/28 209/250 |
| 4,726,151 A * | 2/1988 | Vitale | ..................... | E04D 13/08 52/16 |
| 5,406,966 A * | 4/1995 | Lepkowski | ............. | E04D 13/08 210/162 |
| 5,522,427 A * | 6/1996 | Johnson | .................. | E04D 13/08 137/616.5 |
| 5,533,303 A * | 7/1996 | Harvey | ..................... | E03B 3/02 52/16 |
| 5,681,455 A * | 10/1997 | Takai | ........................ | E03B 3/02 210/170.03 |
| 5,709,051 A * | 1/1998 | Mazziotti | ................ | E04D 13/08 52/12 |
| 5,863,151 A * | 1/1999 | Chapotelle | ................ | E03B 3/02 210/170.03 |
| 5,985,158 A * | 11/1999 | Tiderington | ........... | B01D 29/35 52/12 |
| 6,024,127 A * | 2/2000 | Johnson | .................. | E04D 13/08 52/16 |
| 6,115,970 A * | 9/2000 | Wilczynski | ............. | E04D 13/08 52/12 |
| 6,619,312 B2 * | 9/2003 | Doiron | ..................... | E03B 3/02 137/122 |
| 7,025,076 B2 * | 4/2006 | Zimmerman, Jr. | ....... | E03B 1/04 405/36 |
| 7,395,633 B2 * | 7/2008 | Baeta | ........................ | E03B 3/03 52/12 |

(Continued)

*Primary Examiner* — William M McCalister
(74) *Attorney, Agent, or Firm* — Jose Cherson Weissbrot

(57) ABSTRACT

The present invention discloses a rainwater harvesting system that utilizes a removable rainwater separation box, support plate, and stop assemblies to introduce rainwater through a first channel of the upper cylinder body, separate clean rainwater through a second channel and outlet hole, and discharge it through an outlet pipe.

19 Claims, 12 Drawing Sheets

(56) References Cited

U.S. PATENT DOCUMENTS

| | | | |
|---|---|---|---|
| 7,550,077 B2* | 6/2009 | Graf | E04D 13/08 52/12 |
| 7,779,855 B2* | 8/2010 | McAvoy | E04D 13/08 137/120 |
| 7,895,793 B1* | 3/2011 | Yates | E04D 13/08 52/12 |
| 7,919,002 B1* | 4/2011 | Hurtado | E04D 13/08 210/170.03 |
| 8,006,720 B1* | 8/2011 | Kotansky | E04D 13/08 52/16 |
| 8,097,151 B2* | 1/2012 | Allan | E03F 1/002 52/12 |
| 8,438,788 B2* | 5/2013 | Bell | E04D 13/08 52/12 |
| 8,475,654 B1* | 7/2013 | Smith | E04D 13/08 210/170.03 |
| 8,517,047 B2* | 8/2013 | Teoh | E04D 13/08 210/170.03 |
| 8,528,263 B2* | 9/2013 | Schmidt | E04D 13/08 52/16 |
| 8,578,976 B1* | 11/2013 | Davis | E03B 3/03 52/12 |
| 9,038,320 B1* | 5/2015 | Deakins | E04D 13/08 52/12 |
| 9,080,328 B1* | 7/2015 | Smith | E04D 13/08 |
| 10,435,875 B2* | 10/2019 | Kimberley | E03C 1/264 |
| 11,471,796 B1* | 10/2022 | Sherwood | B01D 35/30 |
| 12,060,285 B2* | 8/2024 | See | B01D 39/10 |
| 2004/0031209 A1* | 2/2004 | Porter | E04D 13/08 52/12 |
| 2006/0101723 A1* | 5/2006 | Baeta | E04D 13/08 52/16 |
| 2006/0191938 A1* | 8/2006 | Zephir | B65F 1/1615 220/293 |
| 2008/0086953 A1* | 4/2008 | Graf | E04D 13/08 52/12 |
| 2008/0163562 A1* | 7/2008 | Conant | E04D 13/0725 52/16 |
| 2010/0038300 A1* | 2/2010 | Allan | E03F 1/002 210/248 |
| 2010/0193046 A1* | 8/2010 | Moroder | F16L 55/24 52/16 |
| 2010/0270219 A1* | 10/2010 | Block | E04D 13/08 210/162 |
| 2011/0005613 A1* | 1/2011 | Griffin | F16L 41/086 220/86.1 |
| 2011/0290355 A1* | 12/2011 | Teoh | E03B 3/03 137/561 R |
| 2014/0352809 A1* | 12/2014 | Griffin | E03B 3/02 137/360 |
| 2016/0017610 A1* | 1/2016 | Denk | E04D 13/08 210/170.03 |
| 2018/0363303 A1* | 12/2018 | Saleh | E04D 13/08 |
| 2023/0302385 A1* | 9/2023 | Sherwood | B01D 29/96 |

* cited by examiner

RAINWATER HARVESTING SYSTEM

TECHNICAL FIELD

The present invention relates to the field of collectors and in particular to the field of a rainwater harvesting system.

BACKGROUND

With urbanization and population growth, there is an increasing demand for rainwater collection and treatment. The traditional way of rainwater collection is mainly through pipes or containers to discharge rainwater into rivers or oceans, and there are many problems in this way, such as excessive discharge, pollution and other problems. Therefore, in order to better deal with the rainwater, many countries and regions have begun to adopt the rainwater harvesting system and treatment technology to improve the efficiency of rainwater treatment and protect the environment. Rainwater harvesting system is a device used to collect and treat rainwater, usually installed in buildings, public facilities or other suitable places, its main purpose is to collect rainwater, make full use of rainwater and form an effective way to save water.

SUMMARY

It is an object of the present invention to provide a rainwater harvesting system having solved the problems raised in the above background technology.

In order to realize said object, the present invention provides the following technical solution: a rainwater harvesting system comprising a main body, a rainwater separation box disposed within the main body, wherein the rainwater separation box is detachably fixed within the main body, the top of the main body is detachably connected to the upper cylinder body, the top of the upper cylinder body is detachably connected to the top cover, and the top cover is provided with a first channel; and the rainwater separation box is provided with a support plate, a first stop component, a second stop component, an outlet hole, an outlet hole, an outlet hole disposed in a side wall of the rainwater separation box, the support plate being disposed in a vertical direction, the bottom of the support plate being fixedly connected to the rainwater separation box the top of the support plate is provided with a certain inclined angle, the support plate is provided with a second channel, the second stop component is snapped onto the second channel of the support plate, the first stop component is fixed to the inner side wall of the rainwater separation box, the second stop component is provided with a certain inclined angle;

the underside of the second stop component extends from the baffle plate, the baffle plate corresponds to the second channel position of the support plate, the second stop component is snap-fitted to the second channel of the support plate, the second stop component is snap-fitted to or separated from the second channel of the support plate, and the top of the support plate has a certain inclined angle;
  the front side of the rainwater separation box is provided with a first opening, and the first opening is located at a certain distance from the inner side wall of the main body, and rainwater flows into the bottom side of the rainwater separation box through the through hole of the second stop component, and tree branches and other debris fall into the lower pipe of the main body along the second stop component through the first opening.

The present invention also provides a method of collecting rainwater comprising providing a rainwater harvesting system comprising a top cover, an upper cylinder body, a rainwater separation box, a main body, a first channel, an outlet pipe, and a lower pipe; directing rainwater through said first channel and filtering it through said rainwater separation box; directing filtered rainwater to flow into a domestic water reservoir through said outlet pipe; discharging filtered debris through said lower pipe to be discharged into a waste storage container; disassembling said top cover, upper cylinder body, rainwater separation box, and main body to clean debris therefrom.

Compared with the prior art, the present invention has the following beneficial effects: the rainwater harvesting system provided by the present invention is small in size, easy to install and carry, and the components of the rainwater harvesting system can be disassembled, which makes it easy to clean the various parts inside the rainwater harvesting system, and the rainwater harvesting system is provided with a filtering component inside the rainwater harvesting system, which is capable of performing preliminary filtration of the rainwater, and discharges impurities in the rainwater from a rainwater separator, so that the rainwater collected by the rainwater harvesting system is purer and meets the user's needs for use. The rainwater collected by the rainwater harvesting system is purer and meets the user's needs, giving the user a better experience.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

In the drawings.

Figure 1:
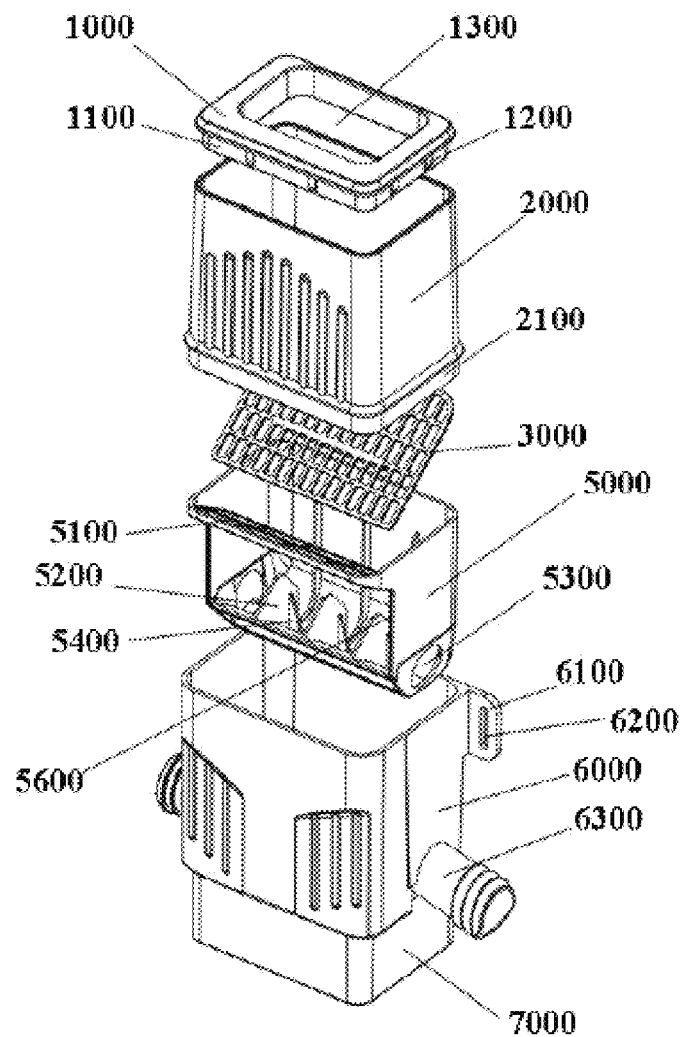
FIG. 1 is an exploded view I of a rainwater harvesting system.
Figure 2:
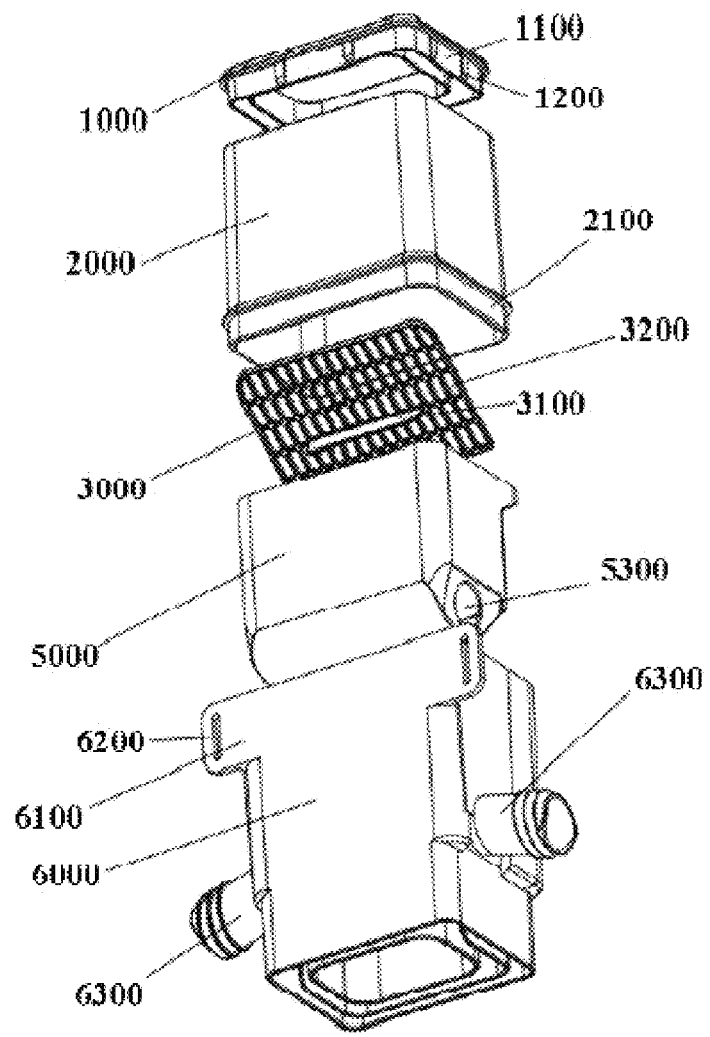
FIG. 2 is an exploded view II of the rainwater harvesting system.
Figure 3:
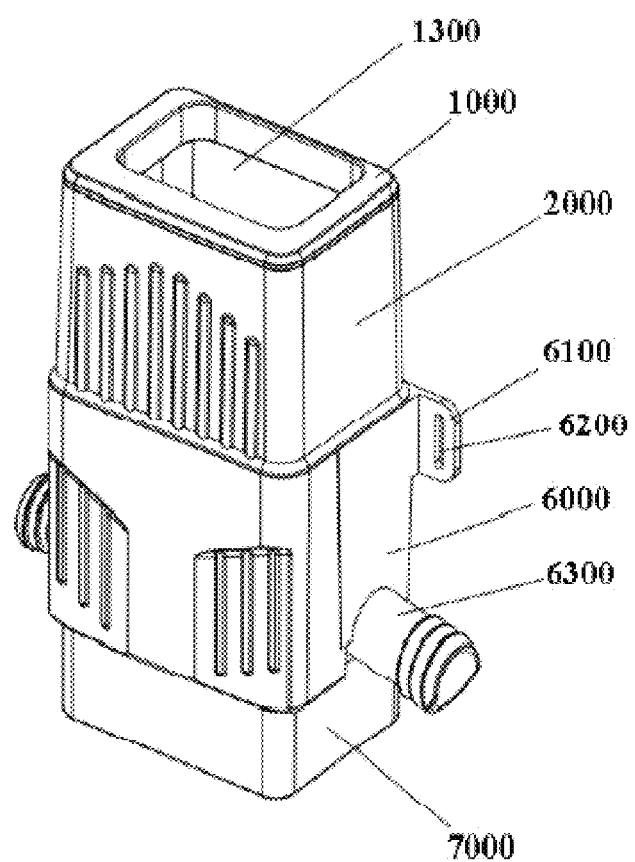
FIG. 3 is a schematic view I of the rainwater harvesting system.
Figure 4:
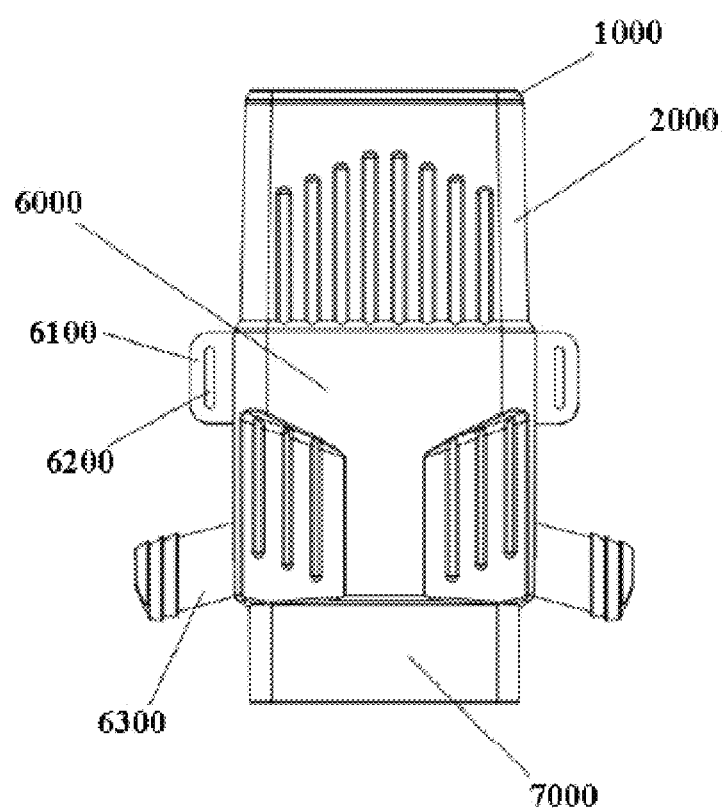
FIG. 4 is a front view of the rainwater harvesting system.
Figure 5:
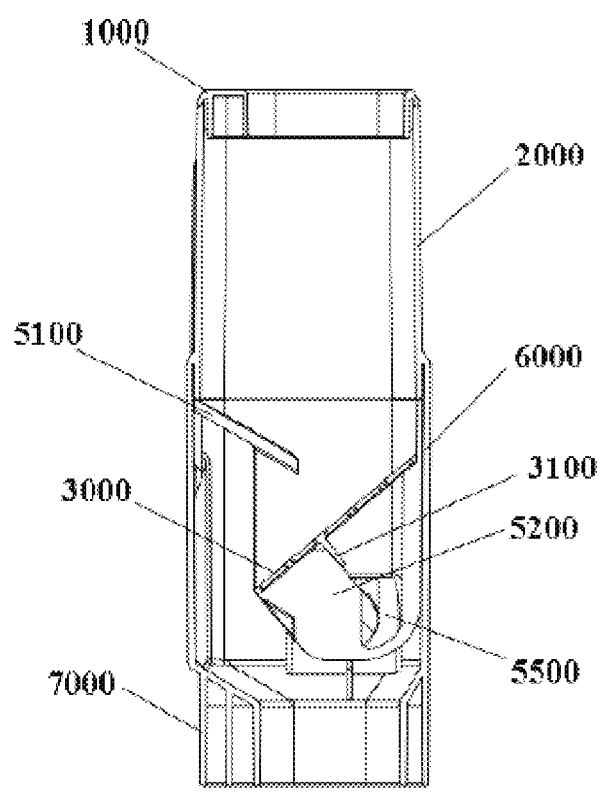
FIG. 5 is an exploded views of the rainwater harvesting system.
Figure 6:
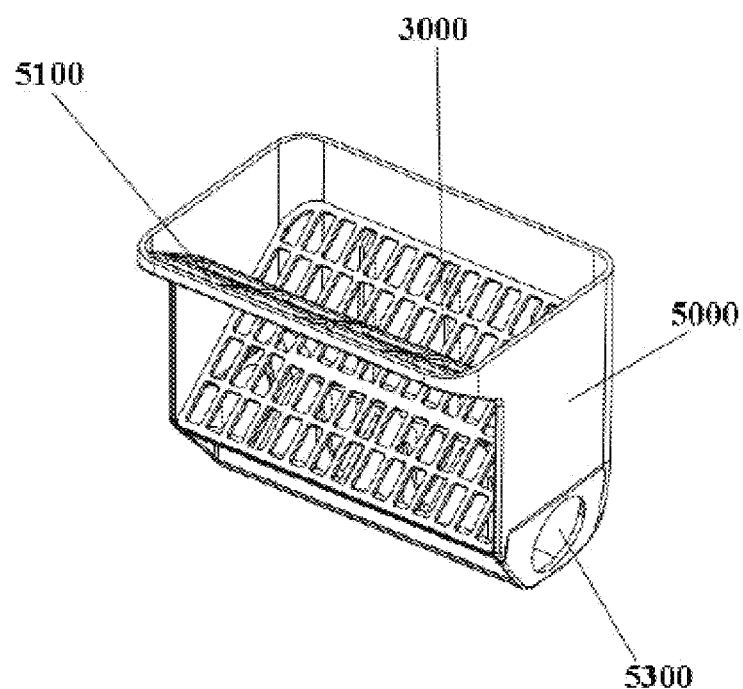
FIG. 6 is a schematic view of the rainwater separation box and the second stop component.
Figure 7:
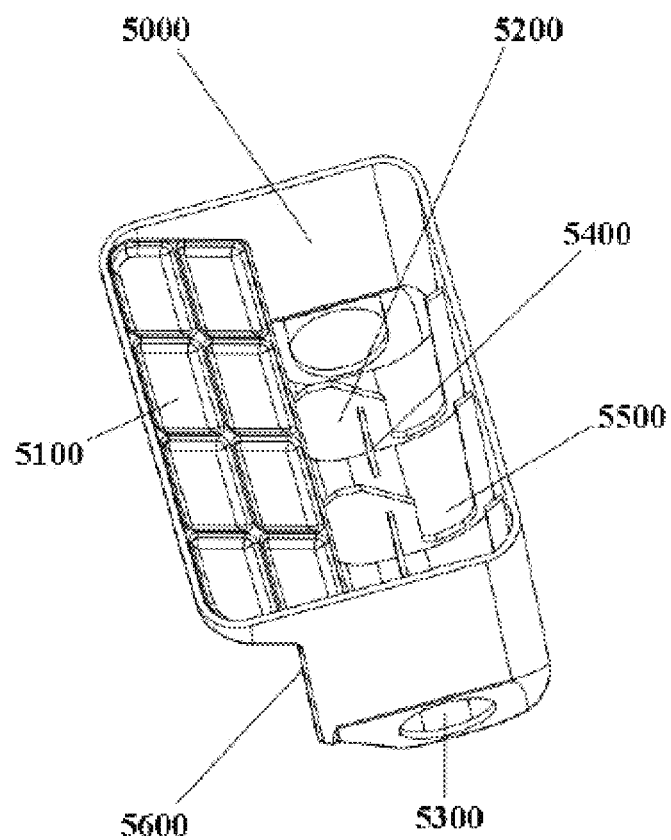
FIG. 7 is a schematic view of the rainwater separation box.
Figure 8:
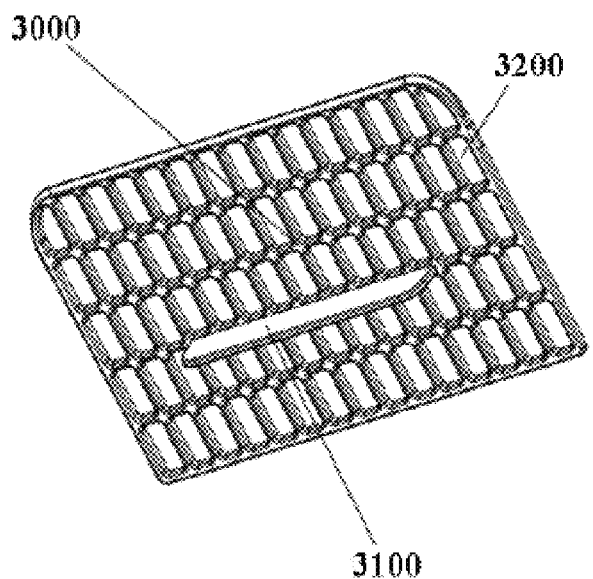
FIG. 8 is a schematic view of the second stop component.
Figure 9:
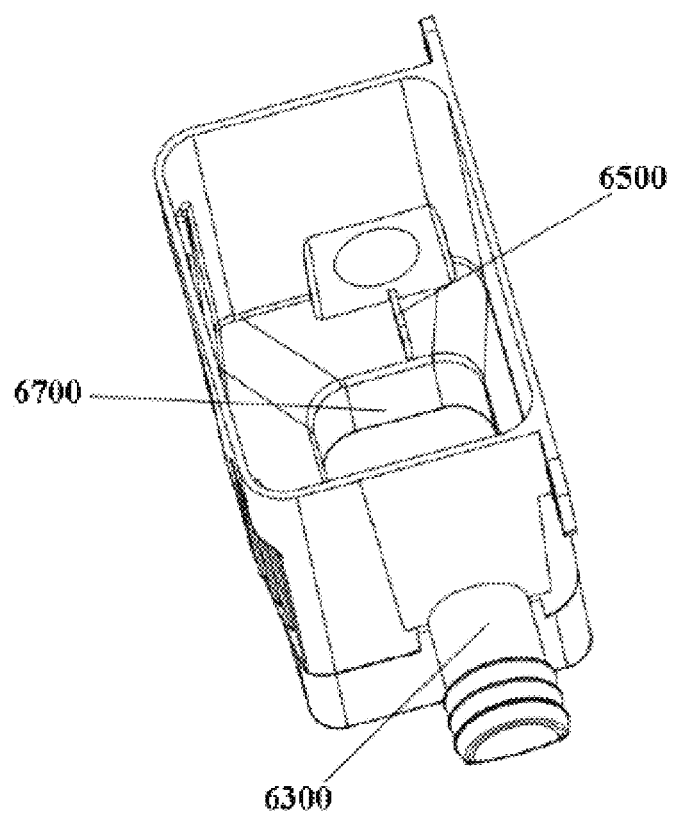
FIG. 9 is a schematic view I of the main body.
Figure 10:
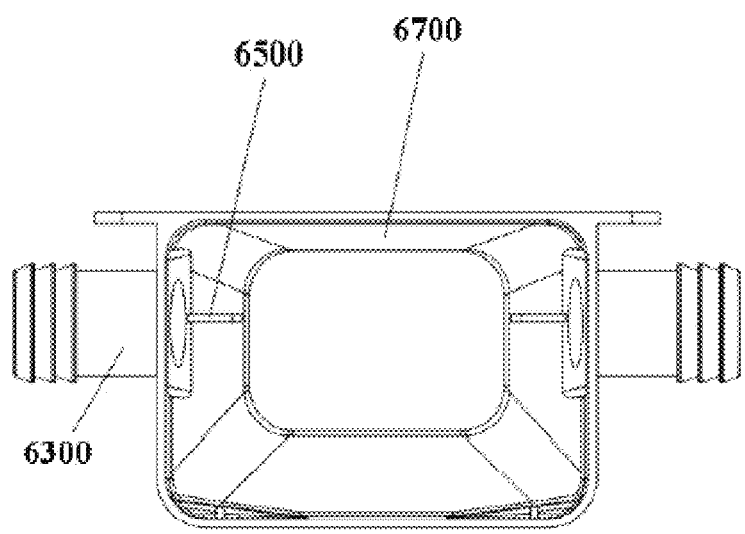
FIG. 10 is a top view of the main body.
Figure 11:
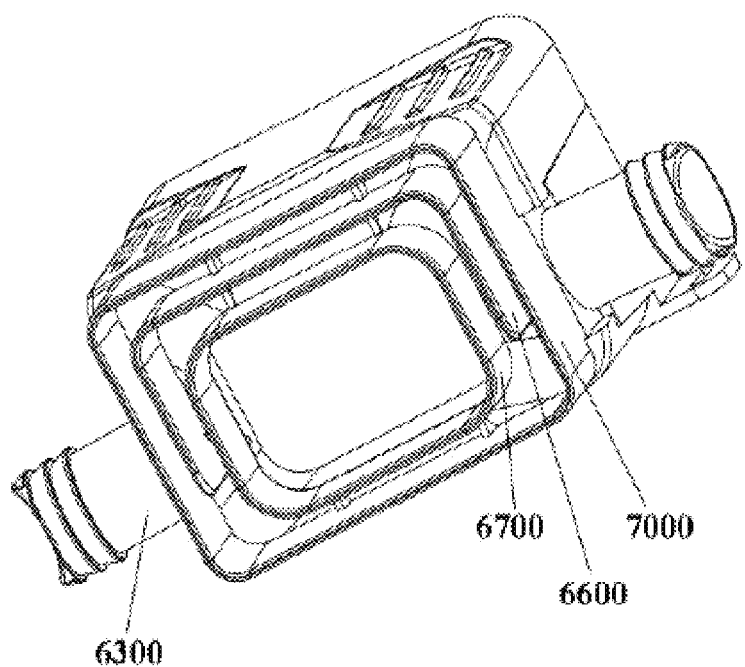
FIG. 11 is a schematic view II of the main body.
Figure 12:
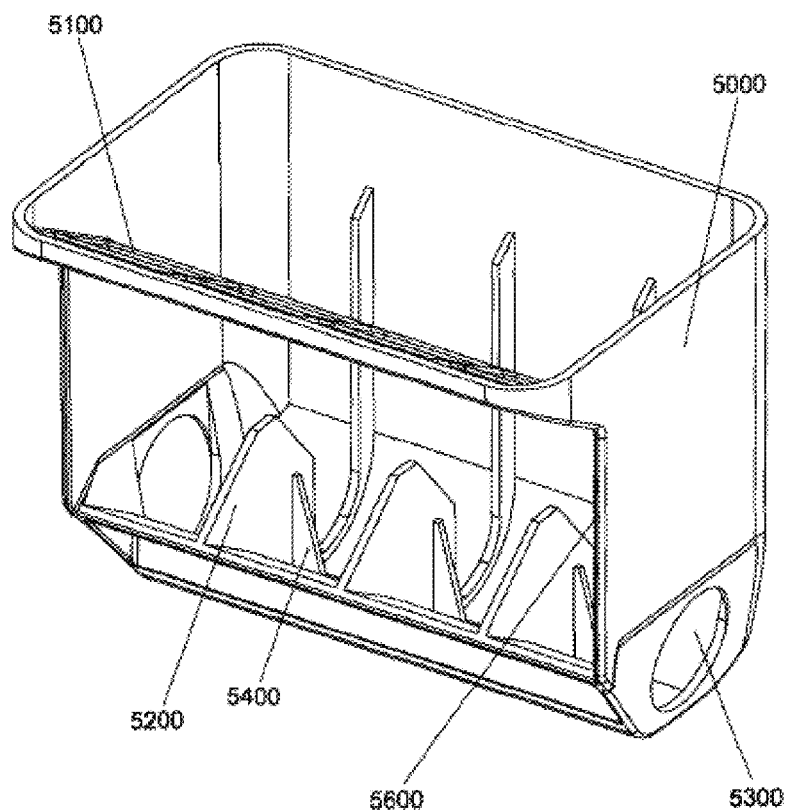
FIG. 12 is a front view of the rainwater separation box.

1000, top cover; 1100, first connection part; 1200, projection part; 1300, first channel; 2000, upper cylinder body; 2100, second connection part; 3000, second stop component; 3100, baffle plate; 3200, through hole; 5000, rainwater separation box; 5100, first stop component; 5200, support plate; 5300, outlet hole; 5400, reinforcement piece; 5500, second channel; 5600, first opening; 6000, main body; 6100, installation plate;

6200, connection hole; 6300, outlet pipe; 6500, support piece; 6600, connection plate; 6700, lower pipe; 7000, lower cylinder body.

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

The present invention provides a rainwater harvesting system comprising: a main body 6000, wherein a rainwater separation box 5000 is provided in the main body 6000, wherein the rainwater separation box 5000 is detachably fixed in the main body 6000, wherein the top of the main body 6000 is detachably connected to the upper cylinder body 2000, wherein the top of the upper cylinder body 2000 is detachably connected to a top cover 1000, and wherein the top cover 1000 is provided with a first channel 1300; the rainwater separation box 5000 is provided with a support plate 5200, a first stop component 5100, a second stop component 3000, and an outlet hole 5300, the outlet hole 5300 being disposed in a side wall of the rainwater separation box 5000, the support plate 5200 being disposed in a vertical direction, the bottom of the support plate 5200 being fixedly connected to the rainwater separation box 5000, the support plate 5200 has a certain inclined angle, the support plate 5200 is provided with a second channel 5500, the second stop component 3000 is snap-fitted to the second channel 5500 of the support plate 5200, and the first stop component 5100 is fixed to the inner side wall of the rainwater separation box 5000, wherein the second stop component 3000 has a certain inclined angle.

Wherein the rainwater separation box 5000 and the main body 6000 are detachably connected, the user can detach the rainwater separation box 5000 from the main body 6000 and clean the rainwater separation box 5000 and the main body 6000, respectively, the first stop component 5100 is provided with concave and convex protrusions on the surface, which can initially filter the rainwater and hold some impurities in the rainwater in the first stop component 5100, and the first stop component 5100 is provided with a certain inclined angle so as to facilitate the transfer of other impurities which are not suitable for filtering to the second stop component, and the rainwater flows down the first stop component 5100 and into the second stop component 3000.

Wherein the reinforcement piece 5400 is provided on both sides of the support plate 5200, and the reinforcement piece 5400 is fixedly connected to the rainwater separation box 5000 at the bottom, and the reinforcement piece 5400 can be provided in a plurality on both sides of the support plate 5200, which can better improve the support strength of the support plate 5200 and improve the quality of use.

Wherein at least one support plate 5200 is provided within the rainwater separation box 5000.

Wherein the side walls on both sides of the main body 6000 are open with the outlet pipe 6300, and the outlet pipe 6300 is provided with a spiral interface suitable for a variety of sizes of household water storage tanks, and the spiral interface enables the main body 6000 to be tightly connected to the water storage tank, and rainwater flows into the household water storage tank along the outlet pipe 6300.

Wherein the main body 6000 is provided with a support piece 6500, wherein the bottom of the support piece 6500 is fixedly connected to the inner wall of the main body 6000, and wherein the support piece 6500 can provide a high support strength and cooperate with the inner structure of the main body 6000 to jointly support the rainwater separation box 5000.

The shapes of the support piece 6500 top include V-shaped, round, oval, rectangular, and so on.

Wherein the bottom of the rainwater separation box 5000 is curved, the bottom of the rainwater separation box 5000 snaps onto the top of the support piece 6500 to fit snugly against the inside sidewall of the main body 6000.

Wherein the installation plate 6100 extends from the top of both sides of the main body 6000, the installation plate 6100 is provided with a connection hole 6200, the connection hole 6200 can be set along the horizontal or vertical direction of the installation plate 6100, the installation plate 6100 can be adapted to a variety of installation environments, the installation plate 6100 has a larger contact area between the installation plate 6100 and the object to be mounted so that the rainwater separator can be fixed in a different position, the user-friendly installation.

Wherein the height at which the top of the support piece 6500 is located is lower than the height at which the bottom of the inner wall of the outlet pipe 6300 is located so that the rainwater separation box 5000 snaps into a suitable position within the main body 6000, and wherein the outlet hole 5300 of the rainwater separation box 5000 corresponds to the opening of the outlet pipe 6300 so that the rainwater flows into the outlet pipe 6300 through the outlet hole 5300.

Wherein the second stop component 3000 snaps onto the support plate 5200, the second stop component 3000 forms a fit with the first stop component 5100, the first stop component 5100 filters a portion of the debris, and the remaining debris, such as tree branches, flows onto the second stop component 3000 for filtration.

Wherein the second stop component 3000 is provided with a through hole 3200, rainwater flows through the through hole 3200 into the rainwater separation box 5000, and the through hole 3200 is provided in a plurality on the second stop component 3000 to better block debris outside of the second stop component 3000 so that more rainwater can pass through the second stop component 3000 and so that the rainwater separator can continue to be used even in more severe weather.

Wherein the second channel 5500 is at a certain distance from the bottom of the rainwater separation box 5000, the rainwater passes through the second channel 5500 and sinks into the outlet pipe 6300 through the outlet hole 5300, and the outlet pipe 6300 can be connected to various sizes of storage buckets, and the holding space formed by forming a holding space between the support plate 5200 can also further block the precipitated impurities in the rainwater in the holding space, and the purer rainwater will flow into the outlet pipe 6300 along the second channel 5500.

Wherein the bottom surface of the second stop component 3000 extends from the baffle plate 3100, and the baffle plate 3100 corresponds to the position of the second channel 5500 of the support plate 5200, which snaps the second stop component 3000 onto the second channel 5500 of the support plate 5200 so that the second stop component 3000 can be disassembled or reassembled into the main body 6000, and the top of the support plate 5200 has a certain inclined angle to better support the second stop component 3000.

Wherein the rainwater separation box 5000 is provided with a first opening 5600 on the front side of the rainwater separation box 5000, and the first opening 5600 is at a certain distance from the inner side wall of the main body 6000, wherein rainwater flows into the bottom surface of the rainwater separation box 5000 through the through hole 3200 of the second stop component 3000, and tree branches and other debris fall into the lower pipe 6700 of the main body 6000 along the second stop component 3000 through the first opening 5600.

Wherein the shape of the lower pipe 6700 can be square, round, conical, etc., and can be adapted to different types of storage bins.

Wherein the lower portion of the main body 6000 is provided with a lower cylinder body 7000, the lower cylinder body 7000 is fixedly connected to the main body 6000, the lower portion of the main body 6000 is also provided with a connection plate 6600, the connection plate 6600 is provided between the lower cylinder body 7000 and the lower pipe 6700, the connection plate 6600 is fixedly connected to the main body 6000, and a clamping space is formed between the lower cylinder body 7000 and the connection plate 6600 and the lower pipe 6700, and the clamping space can be adapted to different sizes of storage tanks, so that the rainwater separator can be connected to different sizes of storage tanks accordingly, and the user can have a better experience of use.

Wherein an upper portion of the main body 6000 is connected to the upper cylinder body 2000, a lower portion of the upper cylinder body 2000 extends with the second connection part 2100, an outer diameter of the second connection part 2100 is smaller than an inner diameter of the main body 6000, the upper cylinder body 2000 is detachably snap-fitted to the upper portion of the main body 6000, the upper cylinder body 2000 and the main body 6000 cooperate with each other for detachably separating or reassembling the upper cylinder body 2000 from the main body 6000, the upper cylinder body 2000 and the main body 6000 are detachably connected, the upper cylinder body 2000 can be disassembled for cleaning the upper cylinder body 2000, and the upper cylinder body 2000 and the main body 6000 are disassembled for easy storage and transportation, and the upper cylinder body 2000 and the main body 6000 are disassembled and stored.

Wherein the upper cylinder body 2000 is connected to the top cover 1000 at the upper portion, the top cover 1000 has a first connection part 1100 extending from the lower portion of the top cover 1000, the outer diameter of the first connection part 1100 is smaller than the inner diameter of the upper cylinder body 2000, the top cover 1000 is detachably snap-fitted to the upper portion of the upper cylinder body 2000, the top cover 1000 and the upper cylinder body 2000 cooperate with each other, the top cover 1000 and the upper cylinder body 2000 can be separated or reassembled, the top cover 1000 and the upper cylinder body 2000 are detachably connected, which facilitates cleaning of the top cover 1000 and the upper cylinder body 2000 and is convenient to disassemble and reassemble, which is more practical.

Wherein the projection part 1200 is provided on the side wall of the first connection part 1100, the projection part 1200 is fixed to the side wall of the first connection part 1100, the projection part 1200 is arranged along the height direction of the first connection part 1100, and at least one projection part 1200 is provided on the first connection part 1100, and the projection part 1200 makes the top cover 1000 connected to the upper cylinder body 2000 more firmly and with stronger stability.

Wherein the inlet pipe is placed in the first channel 1300, the rainwater flows into the rainwater separation box 5000 along the upper cylinder body 2000, the tree branches and other debris flows into the second stop component 3000 after the filtration of the first stop component 5100, a part of the impurities is blocked by the first stop component 5100, in the rainwater after the filtration of the first stop component 5100, the rainwater flows into the second stop component 3000, and the rainwater flows into the outlet pipe 6300 of the rainwater separation box 5000 through the through hole 3200 of the second stop component 3000. After the filtration is completed, another part of the impurities flows into the lower pipe 6700 of the main body 6000, and the second stop component 3000 can be separated from the rainwater separation box 5000 or reassembled, and when there is too much impurity in the rainwater separation box 5000, the top cover 1000, the upper cylinder body 20002, the rainwater separation box 5000 and the main body 6000 can be disassembled, the second stop component 3000 is disassembled, and the impurities in the rainwater separation box 5000 are fished out by hand, and the inside of the main body 6000 is cleaned.

The present invention also provides a method of harvesting rainwater, the method comprising providing a rainwater harvesting system, the rainwater harvesting system comprising a top cover 1000, an upper cylinder body 2000, a rainwater separation box 5000, a main body 6000, a first channel 1300, an outlet pipe 6300, and a lower pipe 6700.

Direct rainwater through the first channel 1300 and filter it through the rainwater separation box 5000.

Discharge filtered rainwater to a domestic water tank via an outlet pipe 6300.

Discharge filtered debris through lower pipe 6700 into waste bin.

Disassemble the top cover 1000, the upper cylinder body 2000, the rainwater separation box 5000, and the main body 6000 to clean them of debris.

The technical means disclosed in the scheme of the present invention are not limited to the technical means disclosed in the above embodiments, but also include the technical scheme composed of any combination of the above technical features. It should be pointed out that for those skilled in the art, several improvements and embellishments can be made without departing from the principle of the present invention, and these improvements and embellishments are also regarded as the protection scope of the present invention.

The terms "comprising." "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

What is claimed is:

1. A rainwater harvesting system, comprising:
   a main body;
   said main body being provided with a rainwater separation box, said rainwater separation box being detachably fixed within said main body, a top of said main body being detachably connected to an upper cylinder body, a top of said upper cylinder body being detachably connected to a top cover, said top cover being provided with a first channel, said rainwater separation box being provided with a support plate, a first stop component, a second stop component, and an outlet hole, said outlet hole being located in a side wall of said rainwater separation box; and
   wherein said support plate is arranged along an vertical direction, a bottom of said support plate is fixedly connected to said rainwater separation box, and said support plate has an angle of inclination, said support plate is provided with a second channel, said second stop component is snap-fitted to said second channel of said support plate, said first stop component is fixedly attached to an inner side wall of said rainwater separation box, said second stop component has an angle of inclination.

2. The rainwater harvesting system of claim 1, wherein said support plate is provided with a reinforcement piece on both sides of said support plate, a bottom of said reinforcement piece being fixedly connected to said rainwater separation box.

3. The rainwater harvesting system of claim 1, wherein a plurality of side walls on both sides of said main body are open with an outlet pipe, and said outlet pipe is provided with a screw interface for a wide range of sizes of a plurality of domestic water storage tanks.

4. The rainwater harvesting system of claim 1, wherein said main body is provided with a support piece, a bottom of said support piece being fixedly connected to an inner wall of said main body.

5. The rainwater harvesting system of claim 4, wherein a shape of a top of said support piece is V-shaped, round, oval, or rectangular.

6. The rainwater harvesting system of claim 5, wherein a height at which the top of said support piece is located is lower than a height at which a bottom of an inner wall of said outlet pipe is located.

7. The rainwater harvesting system of claim 1, wherein a bottom of said rainwater separation box is curved and the bottom of said rainwater separation box snaps onto the top of said support piece in a tight fit with the inner side wall of said main body.

8. The rainwater harvesting system of claim 1, wherein said main body has an installation plate extending from the top of both sides of said installation plate, and said installation plate is provided with a connection hole, and said connection hole is provided in a horizontal or a vertical direction along said installation plate.

9. The rainwater harvesting system of claim 1, wherein said second stop component snaps onto said support plate, said second stop component forms a fit with said first stop component, and said first stop component filters a portion of a debris, with the remaining debris, such as twigs and other debris, flowing onto said second stop component for filtration.

10. The rainwater harvesting system of claim 1, wherein at least one support plate is provided within said rainwater separation box.

11. The rainwater harvesting system of claim 1, wherein said second stop component is provided with a through hole, and rainwater flows through said through hole into said rainwater separation box.

12. The rainwater harvesting system of claim 3, wherein said second channel is spaced from the bottom of said rainwater separation box, said support plate forms a holding space between said support plate, and rainwater passes through said second channel to sink into said outlet pipe through said outlet hole, and said outlet pipe is adapted to be connected to a plurality of storage buckets of varying sizes.

13. A rainwater harvesting system, comprising:
a main body;
said main body being provided with a rainwater separation box, said rainwater separation box being detachably fixed within said main body, a top of said main body being detachably connected to an upper cylinder body, a top of said upper cylinder body being detachably connected to a top cover, said top cover being provided with a first channel, said rainwater separation box being provided with a support plate, a first stop component, a second stop component, and an outlet hole, said outlet hole being located on a side wall of said rainwater separation box;
wherein said support plate is arranged along an vertical direction, said support plate is fixedly connected to said rainwater separation box at a bottom of said support plate, a top of said support plate has a certain inclined angle, said support plate is provided with a second channel, said second stop component snaps onto said second channel of said support plate, said first stop component is fixed to an inner side wall of said rainwater separation box, and said second stop component has an inclined angle; and
a baffle plate extending from a lower surface of said second stop component, said baffle plate corresponding to a position of said second channel of said support plate, said second stop component snapping onto said second channel of said support plate, said second stop component snapping onto said second channel of said support plate or onto said second channel of said support plate separated from said second channel, the upper surface of said support plate having an inclination angle; and
said rainwater separation box is provided with a first opening at a front side of said rainwater separation box, said first opening at the front side of said rainwater separation box being at a certain distance from the inner side wall of said main body, wherein rainwater flows into a bottom side of said rainwater separation box through a through hole of said second stop component, and a debris including a plurality of tree branches, falls along said second stop component through said first opening into a lower pipe of said main body.

14. The rainwater harvesting system of claim 13, wherein a shape of said lower pipe of said main body is of a shape selected from a group comprising square, round, and conical.

15. The rainwater harvesting system of claim 13, wherein said main body is provided with a lower cylinder body in a lower part of said main body, said lower cylinder body being fixedly connected to said main body, and said main body is further provided with a connection plate in the lower part of said main body, said connection plate being provided between said lower cylinder body and said lower pipe of said main body, said connection plate being fixedly connected to said main body, and said lower cylinder body forms a clamping space between said connection plate and said lower pipe of said main body, which is adapted to be connected in accordance with a plurality of storage tanks of varying sizes.

16. The rainwater harvesting system of claim 15, wherein an upper portion of said main body is connected to said upper cylinder body, a lower portion of said upper cylinder body extends with a second connection part, an outer diameter of said second connection part is smaller than an inner diameter of said main body, and said upper cylinder body detachably snaps onto said upper portion of said main body, and said upper cylinder body interacts with said main body for separating or reassembling said upper cylinder body from said main body.

17. The rainwater harvesting system of claim 16, wherein said upper cylinder body is connected to said top cover at the upper portion, said top cover has a first connection part extending from a lower portion of said top cover, an outer diameter of said first connection part is smaller than the inner diameter of said upper cylinder body, said top cover detachably snaps into said upper cylinder body at the upper portion of said upper cylinder body, and said top cover and said upper cylinder body cooperate with each other after said top cover is detached from said upper cylinder body or reassembled.

18. The rainwater harvesting system of claim 17, wherein said first connection part is provided with said second stop component snaps on the side wall of said first connection part, a projection part is fixed to the side wall of said first connection part, said projection part is arranged in the height direction of said first connection part, and at least one said projection part is provided on said first connection part.

19. The rainwater harvesting system of claim 13, wherein said first channel is located in the center of said top cover, and said first channel is shaped in the form of a rectangle, a circle, an oval, or a rhombus.

* * * * *